United States Patent
Gautrot et al.

(10) Patent No.: US 8,544,318 B2
(45) Date of Patent: Oct. 1, 2013

(54) ABNORMAL COMBUSTION DETECTION METHOD FOR INTERNAL-COMBUSTION ENGINES

(75) Inventors: Xavier Gautrot, Rueil Malmaison (FR); Gaétan Monnier, Rueil Malmaison (FR); Laurent Simonet, Rueil Malmaison (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 643 days.

(21) Appl. No.: 11/721,704

(22) PCT Filed: Dec. 14, 2005

(86) PCT No.: PCT/FR2005/003210
§ 371 (c)(1), (2), (4) Date: Jul. 21, 2009

(87) PCT Pub. No.: WO2006/067333
PCT Pub. Date: Jun. 29, 2006

(65) Prior Publication Data
US 2009/0308146 A1 Dec. 17, 2009

(30) Foreign Application Priority Data
Dec. 17, 2004 (FR) ..................... 04 13542

(51) Int. Cl.
*G01M 15/11* (2006.01)
(52) U.S. Cl.
USPC ....................... 73/114.02; 73/35.06
(58) Field of Classification Search
USPC ............ 73/35.01, 35.03, 35.06, 35.08, 35.09, 73/35.12, 114.02, 114.03, 114.04, 114.07, 73/114.08
See application file for complete search history.

(56) References Cited

U.S. PATENT DOCUMENTS

| | | | |
|---|---|---|---|
| 3,393,557 A | 7/1968 | Brown et al. | |
| 3,540,262 A | 11/1970 | Wostl et al. | |
| 5,080,068 A | 1/1992 | Sawamoto | |
| 5,140,962 A * | 8/1992 | Iwata ........................ | 123/406.35 |
| 5,505,077 A * | 4/1996 | Fukui et al. ................ | 73/114.18 |
| 5,608,633 A * | 3/1997 | Okada et al. .................. | 701/111 |
| 5,632,247 A * | 5/1997 | Hashizume et al. ..... | 123/406.26 |
| 5,777,216 A * | 7/1998 | Van Duyne et al. ........ | 73/114.67 |
| 5,905,193 A * | 5/1999 | Hashizume et al. ......... | 73/35.09 |
| 6,020,742 A * | 2/2000 | Kano et al. .................... | 324/399 |
| 6,360,587 B1 * | 3/2002 | Noel ............................ | 73/35.08 |
| 6,546,328 B1 * | 4/2003 | Slicker ......................... | 701/111 |
| 7,243,529 B2 * | 7/2007 | Takemura et al. ........... | 73/35.09 |
| 2002/0033041 A1 * | 3/2002 | Yamada et al. .............. | 73/35.01 |

(Continued)

FOREIGN PATENT DOCUMENTS

| | | |
|---|---|---|
| DE | 198 59 310 A1 | 6/2000 |
| FR | 2 558 529 A | 7/1985 |

*Primary Examiner* — Eric S McCall
(74) *Attorney, Agent, or Firm* — Antonelli, Terry, Stout & Kraus, LLP.

(57) ABSTRACT

A method for detecting abnormal combustion in the combustion chamber of at least one cylinder of a spark-ignition supercharged internal-combustion engine includes:
  measuring a quantity linked with the combustion of the fuel mixture in the chamber,
  producing a signal whose amplitude depends on the amplitude of the measured quantity,
  comparing the amplitude of the signal produced with the amplitude of a threshold signal corresponding to the amplitude of a signal during combustion with engine knock,
  determining the presence of a rumble type abnormal combustion in the combustion chamber when the amplitude of the signal produced exceeds the amplitude of the threshold signal by a significant value.

15 Claims, 2 Drawing Sheets

(56) References Cited

U.S. PATENT DOCUMENTS

| | | |
|---|---|---|
| 2002/0069696 A1* | 6/2002 | Hatazawa et al. ............... 73/116 |
| 2003/0010101 A1* | 1/2003 | Zur Loye et al. ............... 73/116 |
| 2003/0164026 A1* | 9/2003 | Koseluk et al. .............. 73/35.08 |
| 2003/0188714 A1* | 10/2003 | Yamamoto et al. ........... 123/435 |
| 2004/0094124 A1* | 5/2004 | Viele et al. ............... 123/406.27 |
| 2005/0000272 A1* | 1/2005 | Takemura et al. ........... 73/35.01 |
| 2009/0150058 A1* | 6/2009 | Kaneko et al. ............. 701/111 |

\* cited by examiner

ABNORMAL COMBUSTION DETECTION METHOD FOR INTERNAL-COMBUSTION ENGINES

FIELD OF THE INVENTION

The present invention relates to a method for detecting abnormal combustion in a combustion chamber of an internal-combustion engine.

It relates more particularly, but not exclusively, to such a method applied to a spark-ignition supercharged engine, preferably of gasoline type.

BACKGROUND OF THE INVENTION

In such an engine, the combustion chamber delimited by the upper part of the piston and the cylinder head contains a fuel mixture that can undergo combustion under the effect of a spark ignition device, such as a spark plug.

It has been observed that this combustion is the source of various combustion noises some of which can seriously damage the engine.

A first noise is the background noise whose vibrational frequency is of very low amplitude and nearly constant. This noise is the result of the propagation of the combustion, which is normally propagated with a flame front from the spark plug. This type of noise is sufficiently low not to risk damaging the engine.

A second noise, which is a parasitic noise, is the result of an unwanted combustion referred to as engine knock in the combustion chamber. This engine knock is a sudden and localized self-ignition of part of the fuel mixture prior to the arrival of the flame front due to the ignition of the fuel mixture by the spark plug. As it is generally known, this engine knock produces vibrations of higher amplitude than the background noise, and at given frequencies. This engine knock leads to a local pressure increase and can generate, in case it occurs repeatedly, destructive effects on the engine, especially at the piston.

Finally, a third noise is generated by abnormal combustion. This abnormal combustion mainly affects engines whose size and/or cylinder capacity has been reduced while keeping the same power and/or the same torque as conventional engines, commonly referred to as downsized engines. This type of engines, mainly of gasoline type, is greatly supercharged and this abnormal combustion generally occurs at low engine speeds. In fact, in such an operating range, timing of the fuel mixture combustion is far from the optimum. More precisely, ignition occurs once the piston is beyond its top dead center (TDC). This allows to have a pressure curve referred to as "double-hump curve", where the first hump is the result of compression and of the descent of the piston after the TDC, followed by another hump resulting from the ignition, by the spark plug, of the fuel mixture and from the combustion thereof throughout the expansion phase in the combustion chamber. However, considering the high pressures and temperatures reached in the combustion chamber by supercharging, abnormal combustion takes place long before ignition of the fuel mixture by the spark plug. This combustion is the result of self-ignition with a flame front of a large part of the fuel mixture in the vicinity of the piston TDC and it occurs well upstream from the ignition of the fuel mixture by the spark plug. This abnormal combustion produces a low noise referred to by specialists as rumble type combustion.

All that has been written so far is illustrated by FIG. 1, which is a graph comprising a curve Np showing the evolution of the pressure (in bar) in the combustion chamber as a function of the crankshaft angle (in°) during normal combustion and a curve Rp showing the evolution of this pressure as a function of the same crankshaft angle during rumble type combustion. This evolution is considered during a phase of the piston stroke going from the compression bottom dead center (compBDC at 180° crankshaft) to the expansion bottom dead center (expBDC at 540° crankshaft).

Thus, for normal combustion (curve Np), i.e. without engine knock or rumble, the fuel mixture is compressed in the combustion chamber to about 50 bars as the piston moves from the compression bottom dead center (compBDC) to the vicinity of the top dead center (TDC at about 360° crankshaft angle). From this TDC, the piston stroke is in the opposite direction and the pressure decreases to about 40 bars at a crankshaft angle Va of the order of 380°. At this angle Va, ignition of the compressed fuel mixture is achieved by the spark plug. This therefore provides combustion of the fuel mixture and a pressure increase to about 60 bars at a crankshaft angle of approximately 405°. The piston continues its descending motion until it reaches the expansion BDC and the pressure decreases until it is close to the atmospheric pressure.

For a rumble type combustion (curve Rp), considering the pressure and temperature conditions of the fuel mixture in the combustion chamber, self-ignition of this mixture occurs before the piston reaches the TDC. This self-ignition generates a very large and sudden pressure increase in the combustion chamber, the pressure exceeding 140 bars, long before ignition of the fuel mixture by the spark plug. This pressure then decreases as a result of the piston stroke from the TDC to the expBDC thereof, until it reaches the level of the atmospheric pressure in the vicinity of the expBDC.

This rumble type combustion thus leads to very high pressure levels in the combustion chamber, which can produce partial or total destruction of the moving elements of the engine, such as the piston or the connecting rod, the engine being consequently out of order.

The present invention thus aims to identify an abnormal rumble type combustion with the devices and systems commonly used in engines so as to be able to take the steps allowing to prevent such a combustion during subsequent engine running.

SUMMARY OF THE INVENTION

The present invention thus relates to a method for detecting abnormal combustion in the combustion chamber of at least one cylinder of a spark-ignition supercharged internal-combustion engine, characterized in that it comprises:

measuring a quantity linked with the combustion of the fuel mixture in the chamber, producing a signal whose amplitude depends on the amplitude of the measured quantity, comparing the amplitude of the signal produced with the amplitude of a threshold signal corresponding to the amplitude of a signal during combustion with engine knock, determining the presence of a rumble type abnormal combustion in the combustion chamber when the amplitude of the signal produced exceeds the amplitude of said threshold signal by a significant value.

The quantity can correspond to the vibrations generated in the combustion chamber.

The quantity can also correspond to the pressure generated in the combustion chamber.

The quantity can further correspond to the ionization current during combustion of the fuel mixture in the combustion chamber.

Engine knock detection means can be used to pick up the vibrations generated by the combustion.

After determining the presence of a rumble type abnormal combustion, it is possible to act on the fuel injection parameters to prevent this phenomenon from occurring again.

It is possible to act on the fuel injection timing over at least one cycle after said determination.

It is also possible to act on the amount of fuel injected over at least one cycle after said determination.

BRIEF DESCRIPTION OF THE FIGURES

Other features and advantages of the invention will be clear from reading the description hereafter, with reference to the accompanying figures wherein.

DETAILED DESCRIPTION

Figure 2:
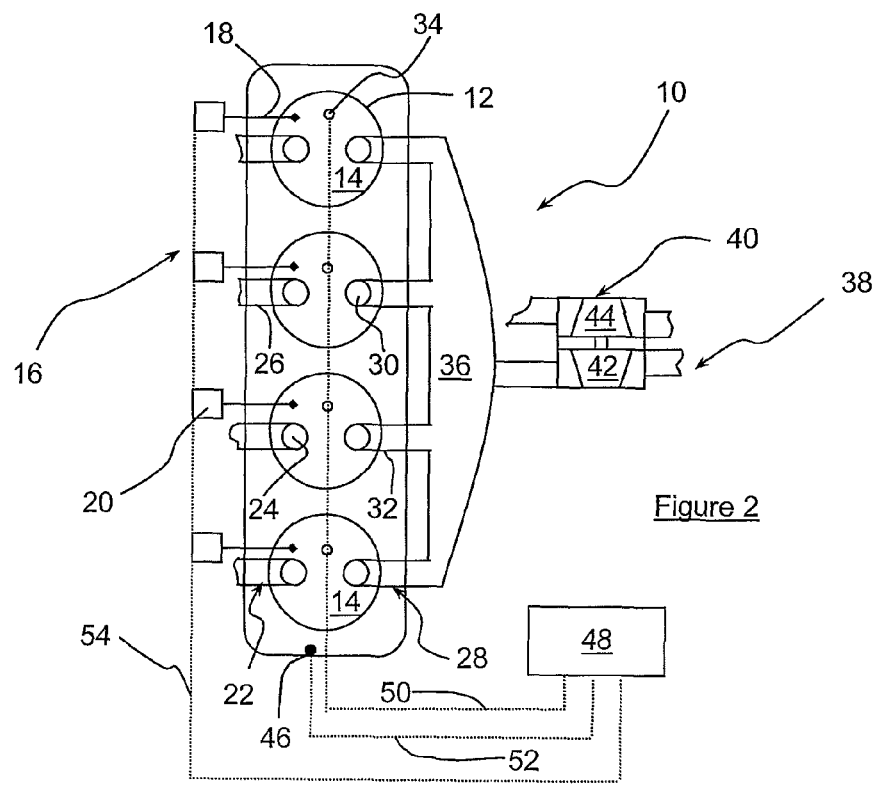
FIG. 2 shows an engine using the detection method according to the invention.

In FIG. 2, a spark-ignition supercharged internal-combustion engine 10, in particular of gasoline type, comprises at least one cylinder 12 with a combustion chamber 14 within which combustion of a mixture of supercharged air and of fuel takes place.

The cylinder comprises at least one means 16 for delivering fuel under pressure, for example in form of a fuel injection nozzle 18 controlled by a valve 20, which opens into the combustion chamber, at least one air intake means 22 with a valve 24 associated with an intake manifold 26, at least one burnt gas exhaust means 28 with a valve 30 and an exhaust manifold 32 and at least one ignition means 34, such as a spark plug, which allows to generate one or more sparks allowing to ignite the fuel mixture present in the combustion chamber.

Manifolds 32 of exhaust means 28 of this engine are connected to an exhaust pipe 36 itself connected to an exhaust line 38. A supercharging device 40, for example a turbosupercharger or a positive-displacement compressor, is arranged on this exhaust line and it comprises a driving stage 42 with a turbine scavenged by the exhaust gases circulating in the exhaust line and a compression stage 44 allowing to feed intake air under pressure into combustion chambers 14 through intake manifolds 26.

The engine usually comprises knock detection means 46 arranged on the cylinder housing of the engine. These detection means generally consist of an accelerometer allowing to generate a signal representative of the appearance of engine knock in the combustion chamber in form of vibration waves.

The engine also comprises a computing and control unit 48, referred to as engine computer, which is connected by conductors (some of which are bidirectional) to the various devices and detectors of the engine so as to be able to receive the various signals emitted by these detectors, such as the temperature of the water or of the oil, in order to process them by computation and then to control the devices of the engine to ensure smooth running thereof.

Thus, in the case of the example shown in FIG. 2, spark plugs 34 are connected by conductors 50 to engine computer 48 so as to control the time of ignition of the fuel mixture, accelerometer 46 is connected by a line 52 to this engine computer so as to send signals representative of vibrations in the combustion chambers thereto and valves 20 controlling injection nozzles 18 are connected by conductors 54 to computer 48 to control fuel injection in the combustion chambers.

Figure 3:
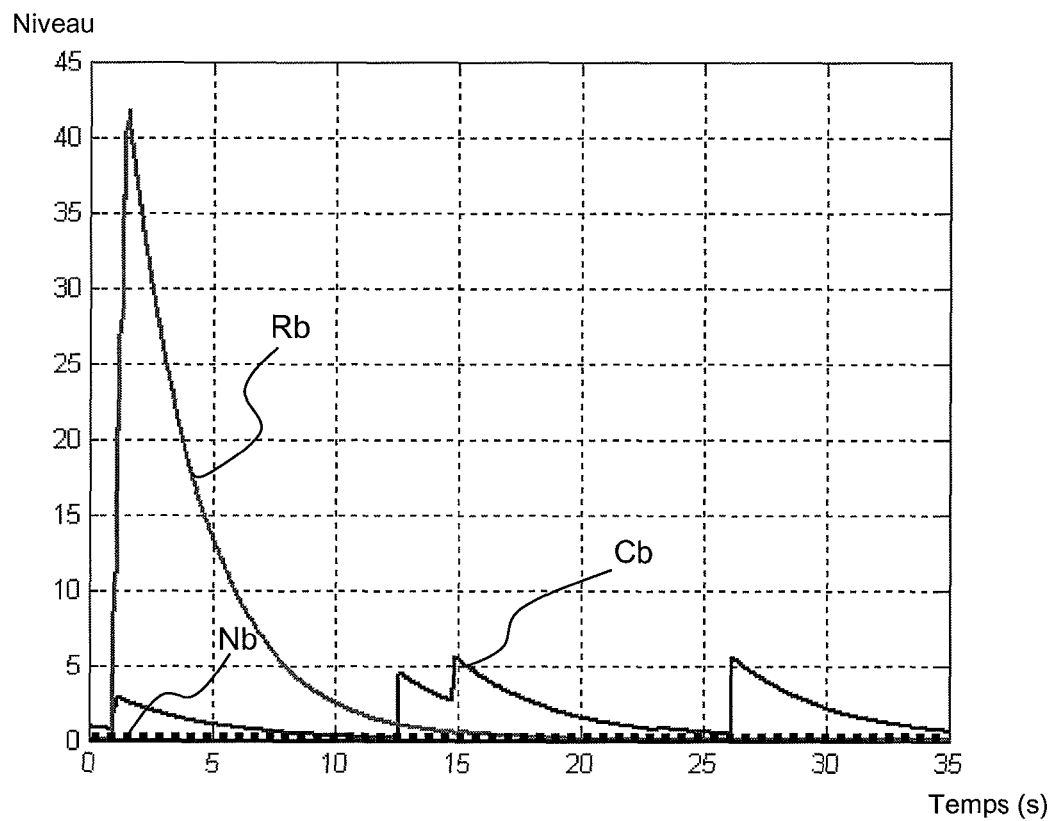
FIG. 3 shows signal level curves resulting from a conventional combustion, a combustion with engine knock and a rumble type abnormal combustion.

FIG. 3 illustrates level curves for the signal detected by the accelerometer for normal combustion (Nb), combustion with engine knock (Cb) and rumble type abnormal combustion (Rb). These curves are curves with integration of the noise level picked up in the course of time (in seconds).

It can be noted that, in this figure, integrated curve Nb of the signal level for normal combustion (shown in dotted line in this figure) is nearly constant and substantially close to 0. Signal level curve Cb for a combustion with engine knock oscillates between a level of about 2 and a level of about 6, whereas signal level curve Rb for a rumble type combustion is far beyond level 40.

Interpretation of this figure allows to evaluate that the amplitude of the vibrations of the rumble type combustion produces a signal level that significantly exceeds the signal level resulting from the amplitude of the vibrations of a normal combustion and of a combustion with engine knock.

In fact, rumble type combustion produces a signal level that is about 40 times the signal level of a normal combustion and about 7 times the maximum signal level of a combustion with engine knock.

In the case of a combustion with engine knock, the signal level may be close to 10 and, in this case, the signal level of a rumble type abnormal combustion will be about 4 times the signal level of this combustion with engine knock.

Figure 1:
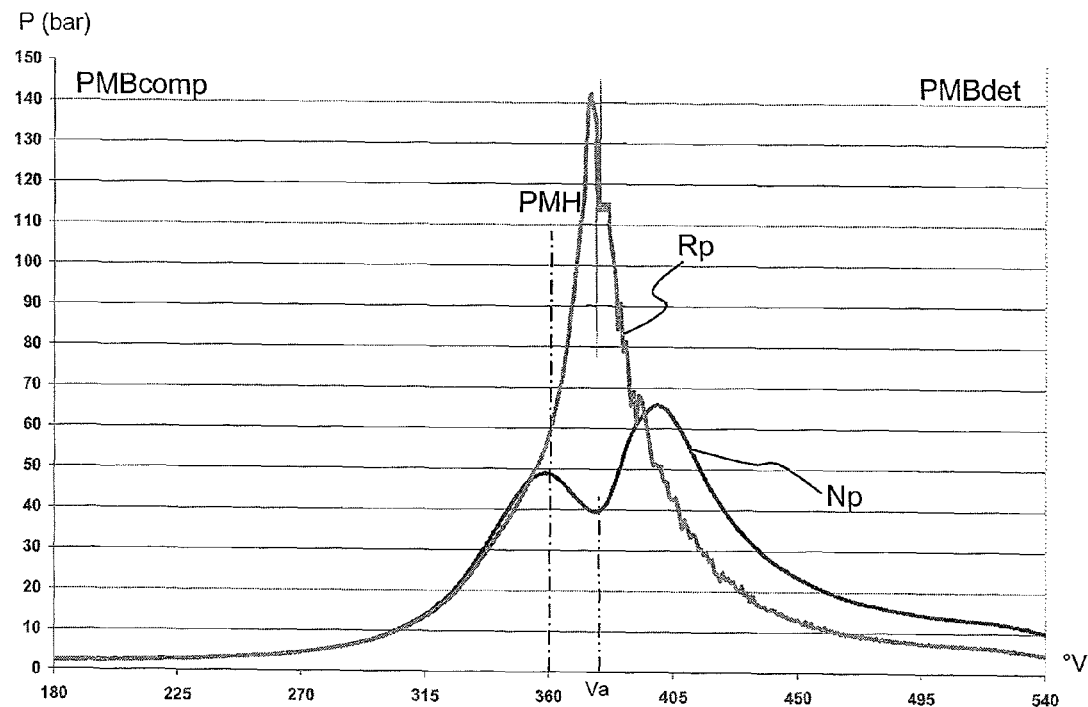
FIG. 1 shows pressure curves for a conventional combustion and for an abnormal combustion.

Thus, during running of the engine as described in connection with FIG. 1, knock detection means 46 pick up the vibrations generated by the combustion in combustion chambers 14 of cylinders 12. This information is sent in form of a signal through line 52 to engine computer 48. This computer produces a signal whose amplitude corresponds to the amplitude of the signals picked up, then this signal is compared with noise level threshold signals representative of a normal combustion and of a combustion with engine knock. Comparison of the signal received from the accelerometer with those of threshold values allows the engine computer to determine the presence of a rumble type abnormal combustion in the combustion chamber. By way of example, as illustrated in FIG. 3, a rumble type abnormal combustion will be detected for a produced signal that is about 40 times the threshold value of a normal combustion or 4 times the threshold value of a combustion with engine knock. This engine computer thereafter sends control instructions to means 16 delivering fuel under pressure through conductors 54 to modify the injection parameters so that this rumble type abnormal combustion does not occur again during the next cycles. Preferably, the engine computer will act on either the fuel injection timing or on the amount of fuel to be injected, or on both, these actions being achieved over at least one cycle after abnormal combustion detection.

Of course, without departing from the scope of the invention, any other quantities linked with the course of the combustion in chamber 14 can be used to detect a rumble type combustion. Thus, we have described so far a signal level representative of the vibrations generated by combustion, but it is also possible to use the quantity linked with the internal pressure of the combustion chamber by means of cylinder pressure detectors. In the case illustrated in FIG. 1, given by way of example only, this pressure is about 4 times the pressure of the threshold value representative of the internal pressure due to the combustion as ignition is initiated by the spark plug. It is also possible to use a signal representative of the ionization current of the fuel mixture during combustion, a current that can be detected at the electrodes of the spark plug.

Of course, the present invention is not limited to the embodiment examples described above and it encompasses any variants and equivalents.

The invention claimed is:

1. A method for detecting abnormal combustion in a combustion chamber of at least one cylinder of a spark-ignition supercharged internal-combustion engine, characterized in that it comprises:
   measuring a quantity linked with the combustion of the fuel mixture in the combustion chamber,
   producing a signal whose amplitude depends on the amplitude of the measured quantity,
   comparing the amplitude of the signal produced with the amplitude of a threshold signal corresponding to the amplitude of a signal during combustion with engine knock, and
   determining the presence of an abnormal combustion of rumble type in the combustion chamber, resulting from self-ignition with a flame front of a large part of the fuel mixture in a vicinity of piston TDC occurring upstream from the ignition of the fuel mixture by a spark plug, when the amplitude of the signal produced exceeds the amplitude of said threshold signal by a significant value.

2. An abnormal combustion detection method as claimed in claim 1, characterized in that the quantity corresponds to the ionization current during combustion of the fuel mixture in the combustion chamber.

3. An abnormal combustion detection method as claimed in claim 1, characterized in that knock detection means are used to pick up vibrations generated by combustion.

4. An abnormal combustion detection method as claimed in claim 1, further comprising, after determining the presence of a rumble type abnormal combustion, acting on fuel injection parameters to prevent the phenomenon from occurring again.

5. An abnormal combustion detection method as claimed in claim 4, further comprising acting on fuel injection timing over at least one cycle after said determination.

6. An abnormal combustion detection method as claimed in claim 4, further comprising acting on an amount of fuel injected over at least one cycle after said determination.

7. An abnormal combustion detection method as claimed in claim 1, characterized in that the quantity corresponds to the vibrations generated in the combustion chamber.

8. An abnormal combustion detection method as claimed in claim 7, characterized in that knock detection means are used to pick up vibrations generated by combustion.

9. An abnormal combustion detection method as claimed in claim 7, further comprising, after determining the presence of a rumble type abnormal combustion, acting on fuel injection parameters to prevent the phenomenon from occurring again.

10. An abnormal combustion detection method as claimed in claim 9, further comprising acting on fuel injection timing over at least one cycle after said determination.

11. An abnormal combustion detection method as claimed in claim 9, further comprising acting on an amount of fuel injected over at least one cycle after said determination.

12. An abnormal combustion detection method as claimed in claim 1, characterized in that the quantity corresponds to the pressure generated in the combustion chamber.

13. An abnormal combustion detection method as claimed in claim 12, further comprising, after determining the presence of a rumble type abnormal combustion, acting on fuel injection parameters to prevent the phenomenon from occurring again.

14. An abnormal combustion detection method as claimed in claim 13, further comprising acting on fuel injection timing over at least one cycle after said determination.

15. An abnormal combustion detection method as claimed in claim 13, further comprising acting on an amount of fuel injected over at least one cycle after said determination.

* * * * *